US011151600B2

(12) United States Patent
Perrone et al.

(10) Patent No.: US 11,151,600 B2
(45) Date of Patent: *Oct. 19, 2021

(54) COGNITIVE ANALYSIS OF USER ENGAGEMENT WITH VISUAL DISPLAYS

(71) Applicant: International Business Machines Corporation, Armonk, NY (US)

(72) Inventors: Antonio Perrone, Rome (IT); Alessandro Donatelli, Rome (IT); Gianluca Della Corte, Rome (IT); Antonio Sgro, Fiumicino (IT); Roberto Pecoraro, Montecorvino Pugliano (SA)

(73) Assignee: International Business Machines Corporation, Armonk, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/959,387

(22) Filed: Apr. 23, 2018

(65) Prior Publication Data

US 2019/0325479 A1 Oct. 24, 2019

(51) Int. Cl.
*G06Q 30/02* (2012.01)
*G06K 9/00* (2006.01)
(Continued)

(52) U.S. Cl.
CPC ....... *G06Q 30/0242* (2013.01); *G06F 16/489* (2019.01); *G06K 9/00234* (2013.01);
(Continued)

(58) Field of Classification Search
CPC ........................................... G06Q 30/02–0277
See application file for complete search history.

(56) References Cited

U.S. PATENT DOCUMENTS 8,326,630 B2 12/2012 Chandrasekar et al.
9,041,766 B1 * 5/2015 Gates ...................... H04N 7/15
348/14.08
(Continued)

FOREIGN PATENT DOCUMENTS

WO 2008067543 A2 6/2008

OTHER PUBLICATIONS

Lanner. "Recognition Systems in Digital Signage for Retail". Nov. 20, 2017. [retrieved from internet on Jul. 16, 2021], <URL: https://www.lanner-america.com/blog/recognition-systems-digital-signage-retail/> (Year: 2017).*

(Continued)

*Primary Examiner* — Bion A Shelden
(74) *Attorney, Agent, or Firm* — Patterson + Sheridan, LLP (57) ABSTRACT

An image captured at a first moment in time is received. A user is identified by comparing at least one facial feature extracted from the image with user information stored in a database. It is determined whether the user observed a visual display by determining whether the visual display was within the visual field of the user. Upon determining that the user observed the visual display, the image is processed with a sentiment analysis module to determine a sentiment of the user. Further, it is determined, based on a record stored in a transaction database, that the user purchased the first product at a second moment in time, and an engagement index is generated for the visual display based on processing the determined sentiment of the user and a period of elapsed time between the second moment in time and the first moment in time.

12 Claims, 6 Drawing Sheets

(51) Int. Cl.
*G06Q 20/12* (2012.01)
*G06F 16/48* (2019.01)

(52) U.S. Cl.
CPC ......... *G06Q 20/12* (2013.01); *G06Q 30/0224* (2013.01); *G06Q 30/0255* (2013.01)

(56) References Cited

U.S. PATENT DOCUMENTS

| | | | |
|---|---|---|---|
| 9,384,493 B2 | 7/2016 | Harris et al. | |
| 2007/0073585 A1 | 3/2007 | Apple et al. | |
| 2008/0248815 A1* | 10/2008 | Busch | G06Q 30/0261 455/456.5 |
| 2009/0216579 A1 | 8/2009 | Zen et al. | |
| 2010/0198680 A1* | 8/2010 | Ma | G06Q 30/0247 705/14.45 |
| 2011/0137737 A1* | 6/2011 | Baird | G06Q 30/0242 705/14.73 |
| 2011/0231239 A1* | 9/2011 | Burt | G06Q 30/02 705/14.41 |
| 2011/0298702 A1* | 12/2011 | Sakata | G06F 3/013 345/156 |
| 2011/0302025 A1* | 12/2011 | Hsiao | G06Q 30/0256 705/14.42 |
| 2013/0035979 A1* | 2/2013 | Tenbrock | G06Q 30/02 705/7.29 |
| 2013/0290994 A1* | 10/2013 | Machado | G06Q 30/0251 725/12 |
| 2013/0298158 A1* | 11/2013 | Conrad | H04N 21/2547 725/34 |
| 2013/0332264 A1* | 12/2013 | Chittilappilly | G06Q 30/02 705/14.45 |
| 2014/0032304 A1* | 1/2014 | Kent | G06Q 30/02 705/14.43 |
| 2015/0020086 A1* | 1/2015 | Chen | H04N 21/44008 725/12 |
| 2015/0227965 A1* | 8/2015 | Drysch | G06K 9/00791 705/14.45 |
| 2015/0234457 A1* | 8/2015 | Kempinski | G06F 3/013 345/156 |
| 2015/0347903 A1* | 12/2015 | Saxena | G06T 11/206 706/11 |
| 2016/0048866 A1* | 2/2016 | Li | G06K 9/00604 705/14.41 |
| 2016/0063318 A1* | 3/2016 | Cheatham, III | H04N 21/812 348/143 |
| 2016/0292713 A1* | 10/2016 | Chen | G06Q 30/0242 |
| 2016/0379225 A1* | 12/2016 | Rider | G06K 9/00248 382/116 |
| 2017/0043781 A1* | 2/2017 | Prakah-Asante | B60W 40/08 |
| 2017/0085962 A1* | 3/2017 | Maughan | H04N 21/4532 |
| 2017/0270560 A1* | 9/2017 | Duggal | H04N 21/44218 |
| 2017/0300961 A1* | 10/2017 | Khvostov | G06Q 30/0246 |
| 2018/0025245 A1* | 1/2018 | Sezgin | G06K 9/00617 382/103 |
| 2018/0144350 A1* | 5/2018 | Mazak | G06F 16/9535 |
| 2019/0075426 A1* | 3/2019 | Nomura | G06Q 30/0261 |
| 2019/0155382 A1* | 5/2019 | Ikuta | H04N 5/64 |
| 2019/0287120 A1* | 9/2019 | Galvez | G06K 9/00335 |

OTHER PUBLICATIONS

U.S. Appl. No. 16/514,419, "Cognitive Analysis of User Engagement with Visual Displays," filed Jul. 17, 2019.
IBM, "List of IBM Patents or Patent Applications Treated as Related," for U.S. Appl. No. 16/514,419, filed Apr. 23, 2018.

\* cited by examiner

COGNITIVE ANALYSIS OF USER ENGAGEMENT WITH VISUAL DISPLAYS

BACKGROUND

The present disclosure relates to cognitive analysis of user engagement, and more specifically, to evaluating the effectiveness of visual displays based on sentiment analysis.

Commercial transactions occur millions of times every day, across countless channels. Individuals can complete transactions in person at a business or other point of sale (POS), over the telephone, or through an online portal (e.g., an online retailer or website). If the purchase is completed with a payment card, such as a credit card or debit card, a record of the transaction is generally also stored in a database for record keeping. In many instances, government regulation actually requires such record keeping. These voluminous records may be useful in determining the financial predilections of the population, as well as the desirability of various products and services, if they can be adequately parsed. Unfortunately, existing solutions fail to provide a satisfactory framework to utilize this data.

Additionally, entities who offer goods and services for sale (e.g., designers, manufacturers, retailers, etc.) frequently attempt to sway individuals through a variety of visual displays, including billboards, posters, signs, and the like. An important metric for such displays is the engagement of the individuals, and the effectiveness of the display with regards to how many purchases it leads to. With some targeted advertisements, such as those sent via mail, email, or targeted to a particular user or device, it may be possible to track whether the targeted individual subsequently purchase the advertised good or service. With non-targeted visual displays (e.g., billboards or signs in public places), however, there are no existing solutions that enable an understanding as to the extent individuals have been affected by the display.

SUMMARY

According to a first embodiment disclosed herein, a system is provided. The system includes one or more computer processors and a memory containing a program which when executed by the one or more computer processors performs an operation. The operation includes receiving an image captured by an imaging sensor adapted to capture images of users viewing a first visual display corresponding to a first product, wherein the image was captured at a first moment in time. The operation further includes identifying a first user by detecting a region of pixels in the image corresponding to the first user and comparing at least one facial feature extracted from the region of pixels with user information stored in a user image database. Additionally, the operation includes analyzing the region of pixels to determine a visual field of the first user based at least in part on an orientation of the first user, and determining whether the first user observed the first visual display by determining whether the first visual display was within the visual field of the first user at the first moment in time. Upon determining that the first user observed the first visual display, the operation includes processing the region of pixels with a sentiment analysis module to determine a first sentiment of the first user. The operation also includes determining, based on a record stored in a transaction database, that the first user purchased the first product at a second moment in time, and generating a first engagement index for the first visual display based on processing the determined first sentiment of the first user and a period of elapsed time between the second moment in time and the first moment in time.

According to a second embodiment disclosed herein, a computer program product comprising a computer-readable storage medium having computer-readable program code embodied therewith is disclosed. The computer-readable program code is executable by one or more computer processors to perform an operation. The operation includes receiving an image captured by an imaging sensor adapted to capture images of users viewing a first visual display corresponding to a first product, wherein the image was captured at a first moment in time. The operation further includes identifying a first user by detecting a region of pixels in the image corresponding to the first user and comparing at least one facial feature extracted from the region of pixels with user information stored in a user image database. Additionally, the operation includes analyzing the region of pixels to determine a visual field of the first user based at least in part on an orientation of the first user, and determining whether the first user observed the first visual display by determining whether the first visual display was within the visual field of the first user at the first moment in time. Upon determining that the first user observed the first visual display, the operation includes processing the region of pixels with a sentiment analysis module to determine a first sentiment of the first user. The operation also includes determining, based on a record stored in a transaction database, that the first user purchased the first product at a second moment in time, and generating a first engagement index for the first visual display based on processing the determined first sentiment of the first user and a period of elapsed time between the second moment in time and the first moment in time.

DETAILED DESCRIPTION

The effectiveness of targeted advertisement can generally be determined with relative ease, because the advertiser already knows who received or observed the targeted ad (e.g., as an email). If the user purchases the product (e.g., using a link or code in the targeted ad), it is trivial to link the user's observation of the ad to the purchase of the product. With non-targeted visual displays, however, there are no existing solutions that enable similar understanding. For example, with displays like billboards, posters, signs, television and radio commercials, non-targeted electronic advertisements, and the like, the individuals who observe the advertisement cannot be identified because the displays are visible and readily observable by large numbers of people and any reaction by an individual user cannot be linked to the advertisement.

Embodiments of the present disclosure provide for cognitive analysis of the effectiveness of visual displays. Some embodiments disclosed herein provide for determinations of the effectiveness of non-targeted displays based on subsequent product purchases. Further, some embodiments herein provide cognitive analysis of user engagement and reaction to non-targeted visual displays, such as utilizing sentiment analysis to determine the user's immediate response to the display. Advantageously, some embodiments of the present disclosure enable analysis of the effectiveness of non-targeted displays even when the display is not associated with a point of sale (POS). For example, the display may be a sign or poster on a public street or other physical location, and the user may use a computer or mobile device to purchase the advertised product or service through an online medium. Embodiments of the present disclosure enable these two disparate events to be linked and analyzed.

Figure 1:
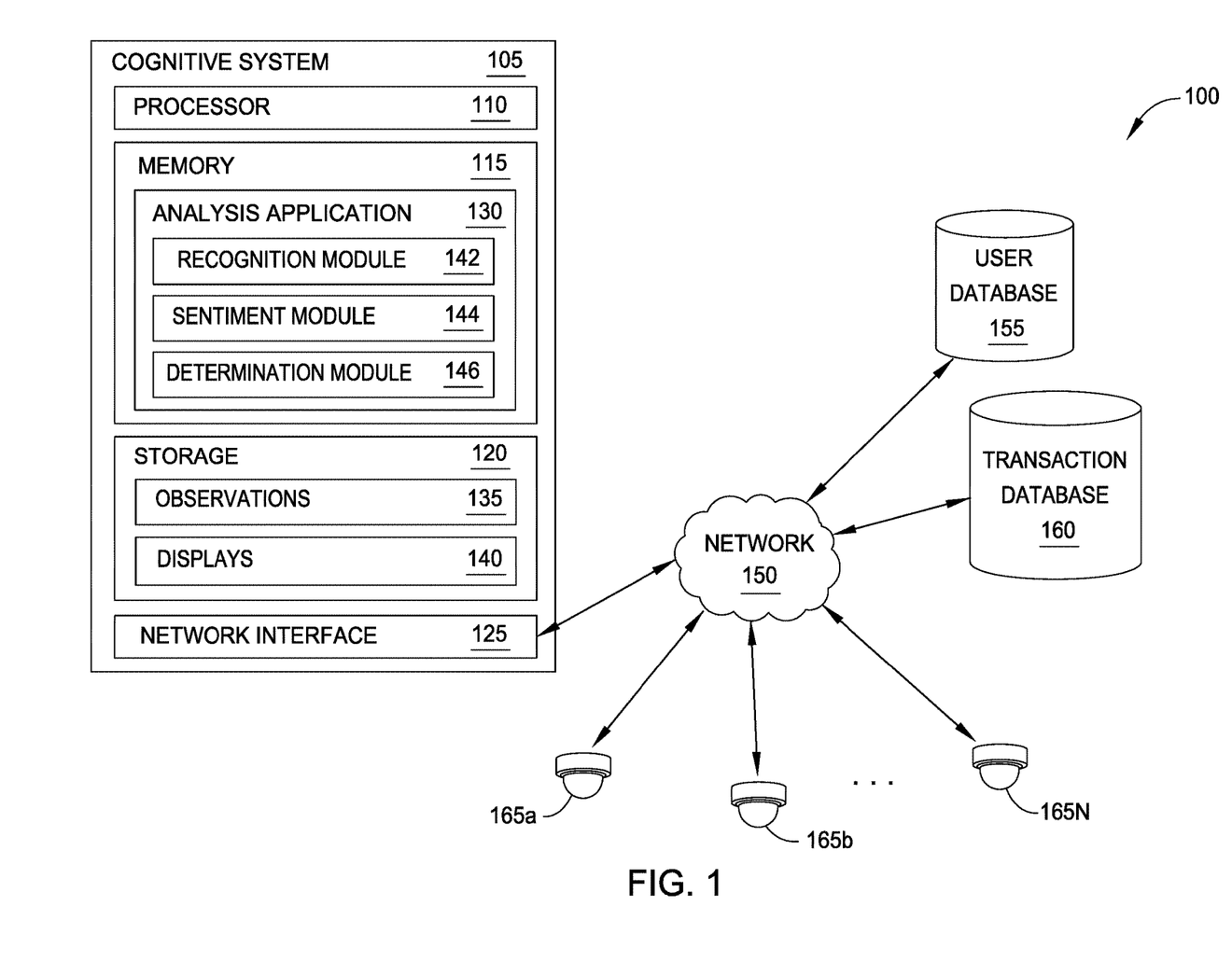
FIG. 1 is a block diagram of a system configured to implement cognitive analysis of user engagement, according to one embodiment of the present disclosure.

FIG. 1 is a block diagram of a system 100 configured to implement cognitive analysis of user engagement, according to one embodiment of the present disclosure. As illustrated, the system 100 includes a Cognitive System 105, a User Database 155, a Transaction Database 160, and a number of Imaging Sensors 165a-N. In the illustrated embodiment, each Imaging Sensor 165 (e.g., camera) is integrated into a visual display or positioned near a visual display, such that the Imaging Sensor 165a-N is adapted to capture images of users observing one or more visual displays. In one embodiment, each Imaging Sensor 165a-N transmits images continuously or periodically to the Cognitive System 105 (e.g., an image every second, every five seconds, and the like). In another embodiment, each Imaging Sensor 165a-N transmits images whenever motion is detected, rather than continuously. For example, in one embodiment, the Imaging Sensors 165a-N transmit begin transmitting when motion is detected (e.g., as a video stream comprising a plurality of images) and cease transmission when no motion is detected.

In embodiments, the User Database 155 includes a record for each user linking the user with the payment cards they possess, as well as one or more images of the user, as will be discussed in more detail below. Further, the Transaction Database 160 includes records of financial transactions (e.g., purchases) made via payment card, including the card used, the product or service purchased, the timing of the purchase, and/or the location/means of the purchase (e.g. in person at an identified POS, through an online retailer, etc.). Although illustrated as separate databases, the User Database 155 and/or the Transaction Database 160 may be implemented within the Cognitive System 105, on a single database, or in any other appropriate data structure and location.

In some embodiments, each user must give permission or consent for their data to be used and analyzed. For example, in one embodiment, the payment card provider (e.g., credit card company) can request permission to parse and analyze the user records in the Transaction Database 160. Similarly, in some embodiments, the user images stored in the User Database 155 are provided by the users, for example in response to a request by the payment card provider. In some embodiments, these user images can also be used for fraud prevention. For example, in some embodiments, one or more images may be captured at the point of sale when the payment card is used. These images can then be compared with the stored user images to ensure that the payment card has not been compromised by a third party who does not have permission to use the card.

In some embodiments, rather than request that the user provide images of themselves, images can be captured at a point of sale when the user uses the payment card. For example, each time the user purchases something with a credit card, one or more imaging sensors located at the POS can capture images of the user, which can be used to populate the User Database 155. In this way, user reference images can be automatically retrieved without requiring affirmative actions on the part of the user. In some embodiments, the user must still provide affirmative assent before the Cognitive System 105 can process the user's data as discussed herein.

In the illustrated embodiment, the Cognitive System 105 includes a Processor 110, a Memory 115, Storage 120, and a Network Interface 125. In the illustrated embodiment, Processor 110 retrieves and executes programming instructions stored in Memory 115 as well as stores and retrieves application data residing in Storage 120. Processor 110 is representative of a single CPU, multiple CPUs, a single CPU having multiple processing cores, and the like. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). In the illustrated embodiment, the Cognitive System 105 is communicatively coupled with the User Database 155, Transaction Database 160, and each Imaging Sensor 165a-N through the Network Interface 125 and over a Network 150 (e.g., the Internet).

In the illustrated embodiment, the Memory 115 includes an Analysis Application 130. Additionally, the Storage 120 includes records of Observations 135 and records of Displays 140. Generally, the Observations 135 include records or logs of each identified observation of a visual display. In various embodiments, the Observations 135 may be stored in a database, or in any other appropriate data structure. In some embodiments, each Observation 135 includes a reference to the user who made the observation (i.e., the user who observed the visual display). Additionally, in some embodiments, each Observation 135 includes an indication of the corresponding Display 140 (i.e., the display that the user observed), along with an indication of the corresponding product or service (i.e., what the display is promoting). In various embodiments, each Observation 135 may further include a timestamp indicating when the observation was made (e.g., a start time, a stop time, or a single timestamp). In some embodiments, each Observation 135 also includes an indication of the sentiment or response of the user, as will be discussed in more detail below.

In the illustrated embodiment, the Displays 140 include records of each visual display that is analyzed using embodiments disclosed herein. For example, in various embodiment, each Display 140 includes an indication of the associated product or service, how long the Display 140 has been posted, the location of the Display 140, the type of Display 140 (e.g., billboard, poster, etc.), and the like. In embodiments, Displays 140 can be stored in a database or other appropriate data structure. In one embodiment, Displays 140 may be added and removed from the records of Displays 140 based on whether the Display 140 is still displayed, whether the provider has paid a subscription fee, and the like. Although illustrated as residing in Storage 120, the Observations 135 and Displays 140 may be stored in any other suitable location, either locally on the Cognitive System 105 or in one or more remote storage locations.

In the illustrated embodiment, the Analysis Application 130 includes a Recognition Module 142, a Sentiment Module 144, and a Determination Module 146. Although illustrated as software components, one or more of the modules or the Analysis Application 130 may similarly operate as one or more hardware modules. The Recognition Module 142 generally receives images captured by the Imaging Sensors 165, and processes them to identify region(s) of pixels in the image that include user(s) by comparing identified facial regions to the records stored in the User Database 155, as will be discussed in more detail below. In some embodiments, the Recognition Module 142 further determines whether the identified user(s) are viewing one or more Displays 140 (e.g., by determining the direction in which the user(s) are looking).

If the Recognition Module 142 determines that the user is observing the Display 140 during at least one moment in time (i.e., in at least one of the images), the Sentiment Module 144 analyzes the identified region(s) of pixels to determine the user's reaction to the Display 140. For example, in various embodiments, the Sentiment Module 144 may consider how long the user viewed the display (e.g., the time between subsequent images that show the user observing the Display 140), whether the user looked away and then back (e.g., did a "double-take"), whether the user passed the Display 140 but turned around and came back to look at it, and the like.

Similarly, in some embodiments, the Sentiment Module 144 performs an emotion analysis (e.g., based on the identified region of pixels) or semantic analysis (e.g., based on audio captured from the user) to determine the emotions or interest of the user based on eye tracking, facial cues, and the like. For example, in one embodiment, the Sentiment Module 144 determines an index for each of a plurality of categories. In one embodiment, the Sentiment Module 144 generates an index for joy, sadness, anger, fear, surprise, contempt, and/or disgust.

In some embodiments, the Sentiment Module 144 utilizes one or more machine learning models to process the identified region(s) of pixels corresponding to the user. For example, a machine learning model can be trained using exemplar images of individuals experiencing various emotions (e.g., excitement, interestedness, etc.) in order to recognize these emotions in the images captured by the Imaging Sensors 165$a$-N. In some embodiments, in addition to scoring each emotion or category, the Sentiment Module 144 also generates a confidence measure indicating how reliable the generated indices are, or how confident it is in the determined emotional state of the user(s).

In an embodiment, once this analysis has been completed, the Analysis Application 130 stores a record of the observation in the Observations 135. These Observations 135 can be later retrieved and processed by other components, such as Determination Module 146. In some embodiments, the Determination Module 146 determines that a user has purchased a product or service. For example, in one embodiment, the Determination Module 146 queries the Transaction Database 160 periodically to determine whether each user has purchased one of the products or services that are promoted by one of the recorded Displays 140. In some embodiments, the Determination Module 146 receives an indication that one of the tracked products or services has been purchased (e.g., as opposed to periodically requesting the records, the records may be pushed to the Cognitive System 105).

In one embodiment, once it is determined that the user purchased a product or service that is promoted by one or more Displays 140, the Determination Module 146 parses the recorded Observations 135 to determine whether the user ever observed any of the identified Displays 140. If so, in an embodiment, the Determination Module 146 generates an engagement index for each Display 140, based on the recorded Observation(s) 135 associated with the Display 140. For example, the Determination Module 146 may consider the timing of the Observation(s) 135, the determined emotion or sentiment in each Observation 135, the timing of the product purchase, and the like. In one embodiment, the Determination Module 146 uses one or more algorithms to generate the engagement index for each Display 140. In some embodiments, the Determination Module 146 utilizes one or more machine learning models to generate the engagement indices. For example, in embodiments, the generated engagement index may depend at least in part on the number of times the user observed the Display 140, the time between observations or between one or more observations (e.g., the first observation, the last observation, etc.) and the purchase, the time between the first and last observations prior to purchase, and the like.

In one embodiment, the shorter the time between the most recent Observation 135 and the purchase of the product, the higher the generated engagement index. In a related embodiment, the more time that elapsed between the first Observation 135 (i.e., the oldest) and the purchase, the lower the generated engagement index. Additionally, in some embodiments, the more times the user observed the Display 140 before purchasing, the lower the engagement index. In various embodiments, the Determination Module 146 also considers the determined sentiment or emotion of each Observation 135, and the length of time that each Observation 135 lasted. For example, in one embodiment, a longer Observation 135 correlates to a higher engagement index, as does a determined sentiment that indicates higher interest. In embodiments, the Determination Module 146 aggregates the data from each related Observation 135 to generate an engagement index for each Display 140 that the user observed. In embodiments, these generated engagement indices may be stored within the corresponding record in Displays 140, or in any other suitable location.

In some embodiments, the engagement index for each Display 140 is represented by E and is generated using Formula 1, below. As discussed above, in some embodiments, the engagement index is defined on a per-user basis. That is, the engagement index indicates how engaged a particular user was with the particular Display 140. In Formula 1, $N_a$ represents the number of times that the user observed the Display 140 with interest. In embodiments, this interest may be determined using, for example, one or more sentiment analysis methodologies, as discussed herein. Further, $N_t$ represents the number of times that the user observed the Display 140 in total. In some embodiments, the engagement index E is not determined until the user actually acquires the good or service. In such an embodiment, the time at which the user purchased the good or service is represented by $T_{now}$. Similarly, the first time that the user observed the Display 140 with interest is represented by $T_{interest}$, and the first time that the user observed the Display 140 in general is represented by $T_{first}$. Formula 1 provides one method of generating the engagement index E for a Display 140.

$$E = \frac{N_a}{N_t} * \frac{T_{now} - T_{interest}}{T_{now} - T_{first}} \quad \text{Formula 1}$$

In some embodiments, the Determination Module 146 further generates effectiveness indices for each Display 140. In one embodiment, the effectiveness index is determined based on the generated engagement indices that correspond to the particular Display 140, as well as the total number of Observations 135 associated with the Display 140. For example, suppose that X users purchased the product and have an associated engagement index (i.e., they also have at least one recorded Observation 135 of the Display 140), and Y users have at least one recorded observation (regardless of whether they purchased the product or not). Suppose further that the generated engagement index for the ith user is represented as $E_i$. In one embodiment, the effectiveness index for the Display 140 is generated according to Formula 2, below.

$$\text{Effectiveness} = \frac{\sum_{i=0}^{X} E_i}{Y} \quad \text{Formula 2}$$

In one embodiment, the Determination Module 146 generates an updated effectiveness index for each Display 140 whenever the associated product or service is purchased by a user who observed the respective Display 140. In some embodiments, the Determination Module 146 refines the effectiveness index periodically, rather than every time a new purchase is made (e.g., every hour, every day, etc.). In some embodiments, the Determination Module 146 generates a refined effectiveness index for a Display 140 only upon request (e.g., at the request of the entity that established the visual display).

Figure 2A:
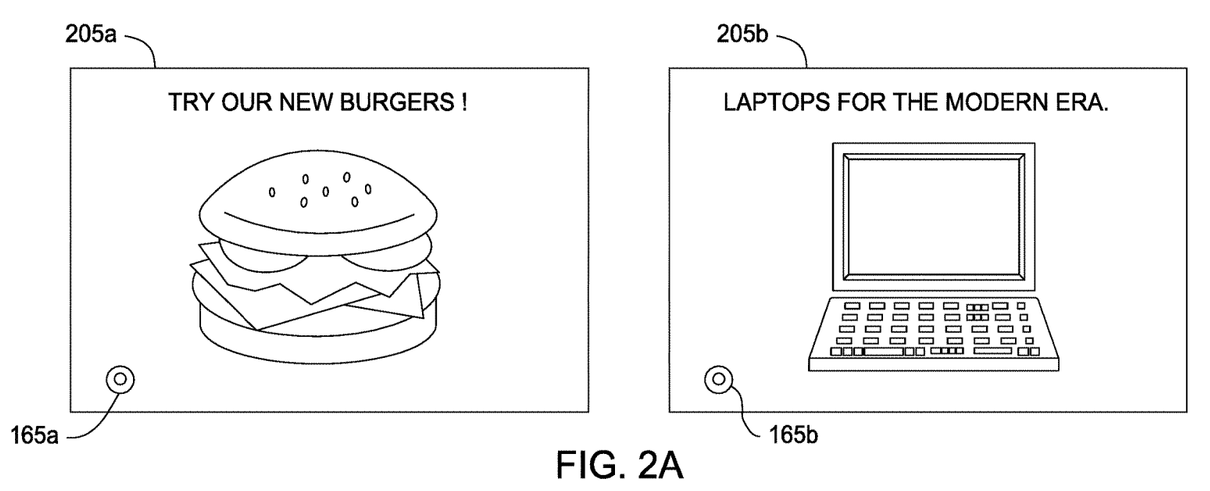
FIGS. 2a and 2b illustrate several visual displays and accompanying hardware, according to one embodiment of the present disclosure.

FIG. 2a illustrates several Visual Displays 205a-b and accompanying hardware, according to one embodiment of the present disclosure. In the illustrated embodiment, Visual Display 205a is an advertisement for a restaurant, while Visual Display 205b promotes a computer brand. As illustrated, each Visual Display 205a-b includes an associated Imaging Sensor 165a-b integrated into the display. For example, the Imaging Sensor 165a may be embedded in the frame or support structure around the Visual Display 205a (e.g., the frame around a billboard or sign). In some embodiments, the Imaging Sensor 165a may be included within or behind the Visual Display 205a (e.g., behind a semi-transparent panel or integrated as part of the advertisement). In the illustrated embodiment, each Imaging Sensor 165a-b corresponds to a particular Visual Display 205a-b. In this way, it need only be determined whether the user(s) are looking towards the Imaging Sensor 165a. If so, in an embodiment, the Recognition Module 142 registers an observation of the display that the Imaging Sensor 165a corresponds to (e.g., Visual Display 205a).

Figure 2B:
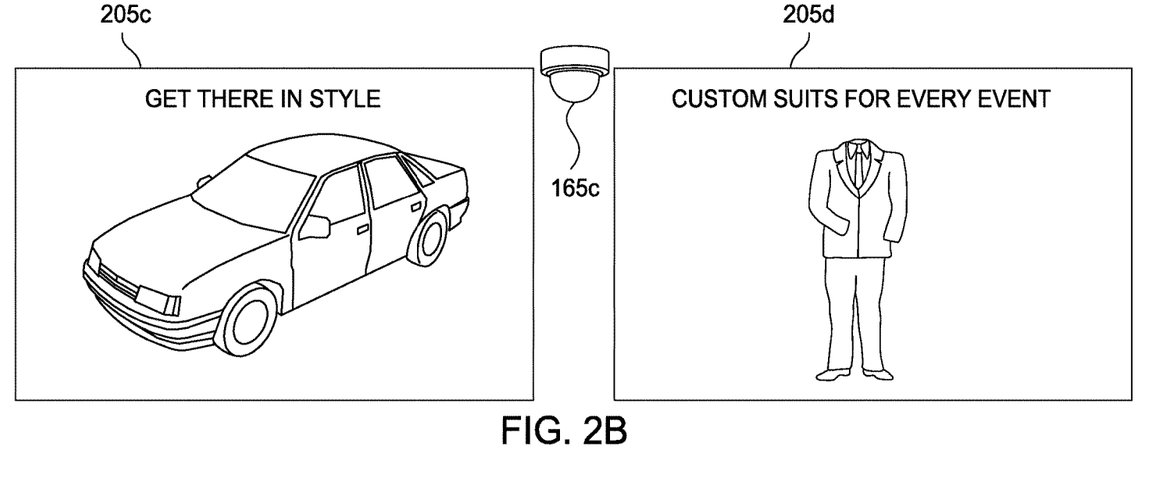

FIG. 2b illustrates several Visual Displays 205c-d and accompanying hardware, according to one embodiment of the present disclosure. In the illustrated embodiment, a single Imaging Sensor 165c is utilized to capture images of users observing both Visual Displays 205c-d. That is, in the illustrated embodiment, each Visual Display 205c-d does not require its own Imaging Sensor 165c, which can reduce the costs associated with each Visual Display 205c-d. In the illustrated embodiment, the Recognition Module 142 first identifies regions of pixels corresponding to facial regions, and then determines whether the users are observing either of the Visual Displays 205c-d. For example, in one embodiment, the Recognition Module 142 determines which direction the user is looking based on their face orientation and/or eye movement.

In an embodiment, the Recognition Module 142 determines whether the user is observing the Visual Display 205c-d based in part on the known location of the Visual Display 205c-d relative to the Imaging Sensor 165c. Additionally, in an embodiment, the location of the user can be determined relative to the Imaging Sensor 165c based on the captured image(s). In this way, in one embodiment, the Recognition Module 142 can determine the location of each user relative to the Visual Displays 205c-d. Furthermore, based on the determined facial orientation and eye orientation, the Recognition Module 142 can thereby determine the field of view or visual fields of the user(s), and whether this visual field includes either of the Visual Displays 205c-d.

Figure 3:
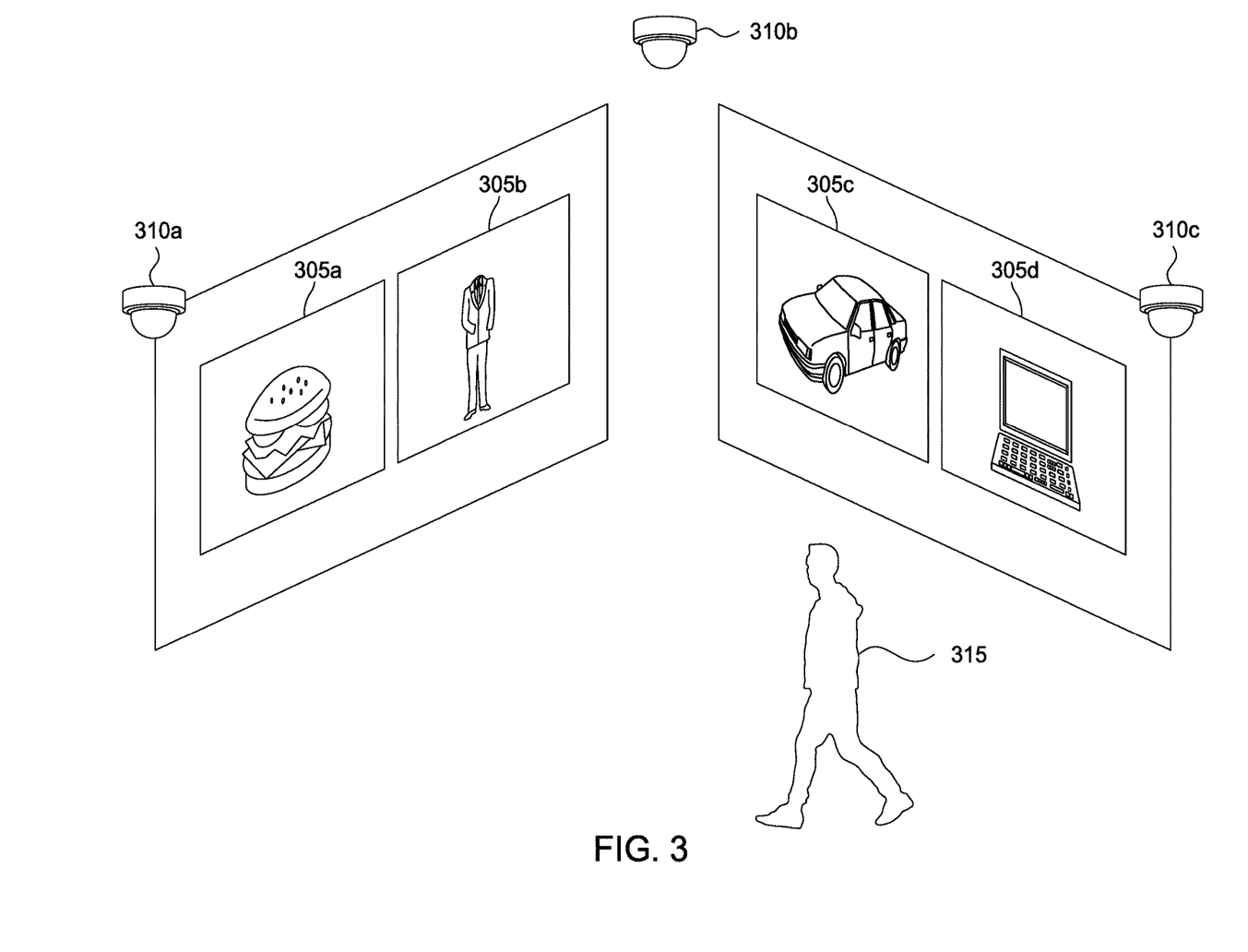
FIG. 3 illustrates several visual displays and accompanying hardware, according to one embodiment of the present disclosure.

FIG. 3 illustrates several Visual Displays 305a-d and accompanying hardware, according to one embodiment of the present disclosure. In the illustrated space, the Visual Displays 305a-d are arranged around a physical space, with three Imaging Sensors 310a-c similarly distributed around the physical space. Further, in the illustrated embodiment, a User 315 is walking through the physical space. As discussed above, in the illustrated embodiment, each the Recognition Module 142 is configured to determine whether the User 315 is Imaging Sensor 310a-c is observing any of the Visual Displays 310a-c based on the determined position of the User 315, the orientation of the user's face and eyes, and the location of each Visual Display 305a-d.

Further, in the illustrated embodiment, the Recognition Module 142 is configured to process images captured by each Imaging Sensor 310a-c in order to determine the movements of the User 315. For example, if the user stops and turns or backtracks to view a Visual Display 305a-d, the Recognition Module 142 can identify this movement. In an embodiment, based on the movements, the Sentiment Module 144 can further determine that the User 315 is more interested in the Visual Display 305a-d. In some embodiments, using images captured by multiple Imaging Sensors 310a-c to determine user interaction with each single Visual Display 305a-d (as opposed to considering images from a single imaging sensor, or from imaging sensors arranged with less diverse angles and positions) enables the capture of additional information, including the movement of the User 315 around the physical space, arm movements, and the like.

Figure 4:
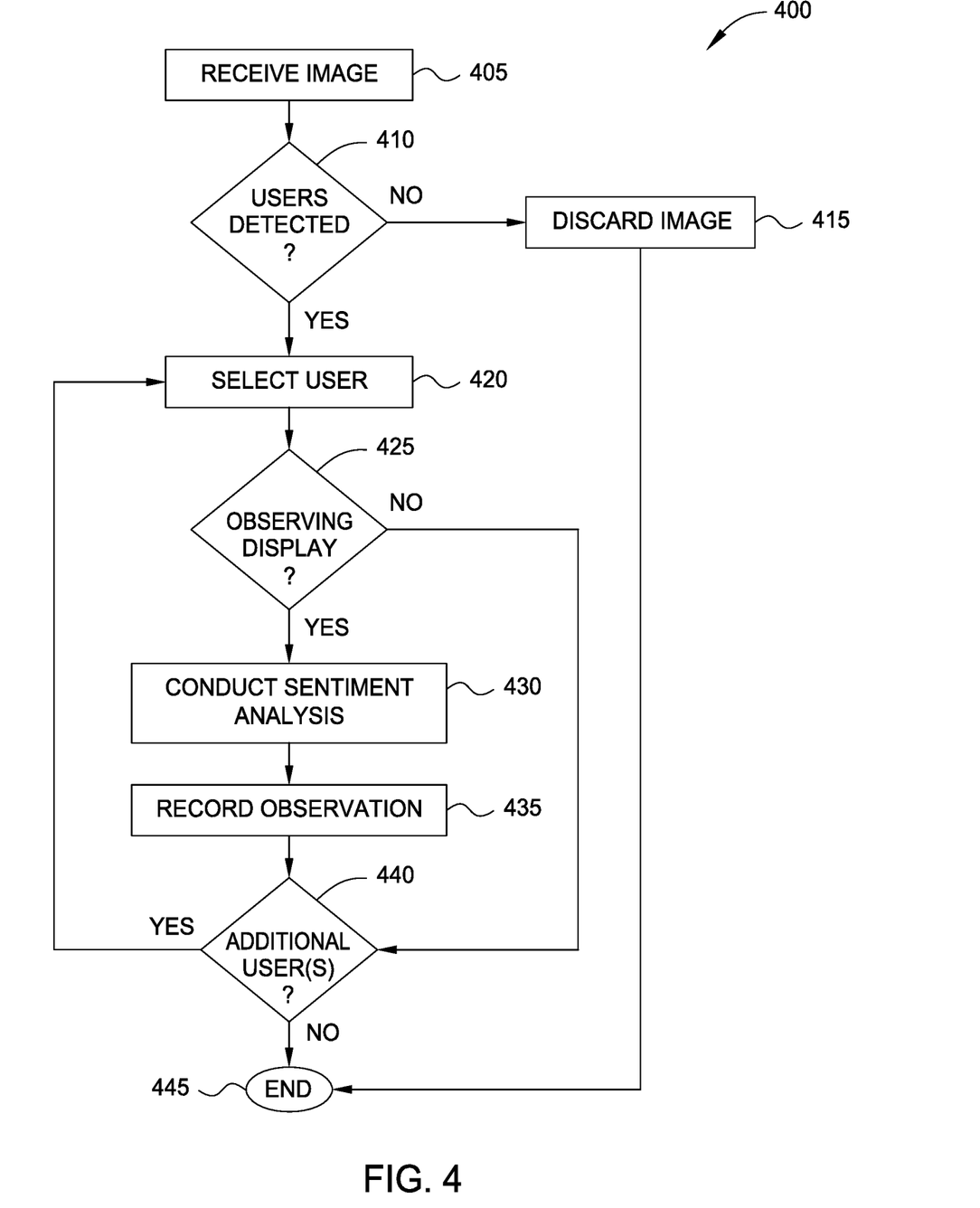
FIG. 4 is a flow diagram illustrating a method of cognitive analysis of user engagement, according to one embodiment disclosed herein.

FIG. 4 is a flow diagram illustrating a method 400 of cognitive analysis of user engagement, according to one embodiment disclosed herein. The method 400 begins at block 405, when the Analysis Application 130 receives an image from an Imaging Sensor 165a-N. As discussed above, in various embodiments this may include a single image, or a video segment comprising a series of images or frames. At block 410, the Recognition Module 142 processes each image to detect users in the image. For example, as discussed above, the Recognition Module 142 may utilize one or more facial recognition methods to identify one or more regions of pixels that include a human face. Further, in an embodiment, the Recognition Module 142 processes those identified region(s) to determine whether the identified faces correspond to user in the User Database 155. For example, in one embodiment, the Recognition Module 142 extracts facial features or landmarks and generates a feature vector representing this data. The Recognition Module 142 can then compare the facial features extracted from each region of pixels with user information stored in the User Database 155 (e.g., the stored images of the user, or features of the user's face that have been previously extracted stored in the User Database 155, such as via a feature vector) to identify the depicted user.

There may be various reasons that no users are identified in a given image. For example, there may be no individuals visible in the image at all. Similarly, the individuals may be positioned such that their faces are not visible in the image. Additionally, there may be individuals present in the image, but no users who have given permission for their data to be used, or no users who have sufficient data (e.g., one or more images or feature vectors) stored in the User Database 155. Regardless of the reason why, if no users are detected, the method 400 proceeds to block 415, where the image is discarded. The method 400 then terminates at block 445. If at least one user is detected and identified, the method 400 proceeds instead to block 420, where the Analysis Application 130 selects one of the identified region(s) of pixel that correspond to a user.

At block 425, it is determined whether the user is observing a Display 140. In various embodiments, this operation may be performed by the Recognition Module 142, by the Sentiment Module 144, or partially by both. For example, as discussed above, the Recognition Module 142 may determine the user's orientation (e.g., where they are facing), and based on this determined visual field, determine whether the user is viewing the Display 140. Similarly, in some embodiments, the eye movements or orientation of the user are also considered. In some embodiments, the Imaging Sensors 165a-N also include one or more audio sensors that record audio of the users. In such an embodiment, block 425 may further include parsing this audio, such as by using one or more natural language processing (NLP) methods, to determine whether the user is talking about the Display 140. In a related embodiment, the User Database 155 may further include an audio sample of the user, or some other data that allows the identification of the user based on his or her voice.

In some embodiments, the Recognition Module 142 may determine that the user did not observe the Display 140, even if the image depicts them looking directly at it. For example, if the user viewed the image for an amount of time that is less than a predefined threshold, the Recognition Module 142 may determine that the user was simply passing by, and was not actually reading or observing the Display 140. If, at block 425, it is determined that the user did not observe a Display 140, the method 400 proceeds to block 440, where it is determined whether there are additional users identified in the image. If so, the method 400 returns to block 420 to select the next user. If not, the method 400 terminates at block 445. If, however, it is determined that the user was observing the Display 140, the method 400 proceeds to block 430.

At block 430, the Sentiment Module 144 conducts sentiment analysis to determine a level of interest of the user. For example, as discussed above, the Sentiment Module 144 may process the identified region of pixels corresponding to the user to determine the expression of the user. Similarly, in embodiments utilizing audio sensors, the Sentiment Module 144 may further parse any captured audio to determine whether the user said anything about the Display 140, and if so, whether the discussion was positive or expressed interest in the product or the Display 140. In one embodiment, the sentiment analysis results in a value between zero and one indicating how interested the user appeared to be. In a related embodiment, this value can be compared to predefined thresholds to determine whether the user was interested (e.g., a score above 0.6 indicates interest, while a score below 0.4 indicates disinterest and a score between 0.4 and 0.6 indicates neutrality). In a similar embodiment, the Sentiment Module 144 may generate a binary result (e.g., interested or disinterested) or a trinary result (e.g., interested, disinterested, or neutral) based on predefined thresholds, rather than an actual value.

At block 435, the Analysis Application 130 records the observation (e.g., in Observations 135). As discussed above, in various embodiments this recording may include the timing of the observation, the Display 140 the user was observing, the associated product or service, the interest of the user, and the like. The method 400 then proceeds to block 440, where it is determined whether additional users were identified in the image (e.g., whether there are additional identified regions of pixels that have not been processed). If so, the method 400 returns to block 420 to select the next region of pixels. Otherwise, the method 400 terminates at block 445.

Figure 5:
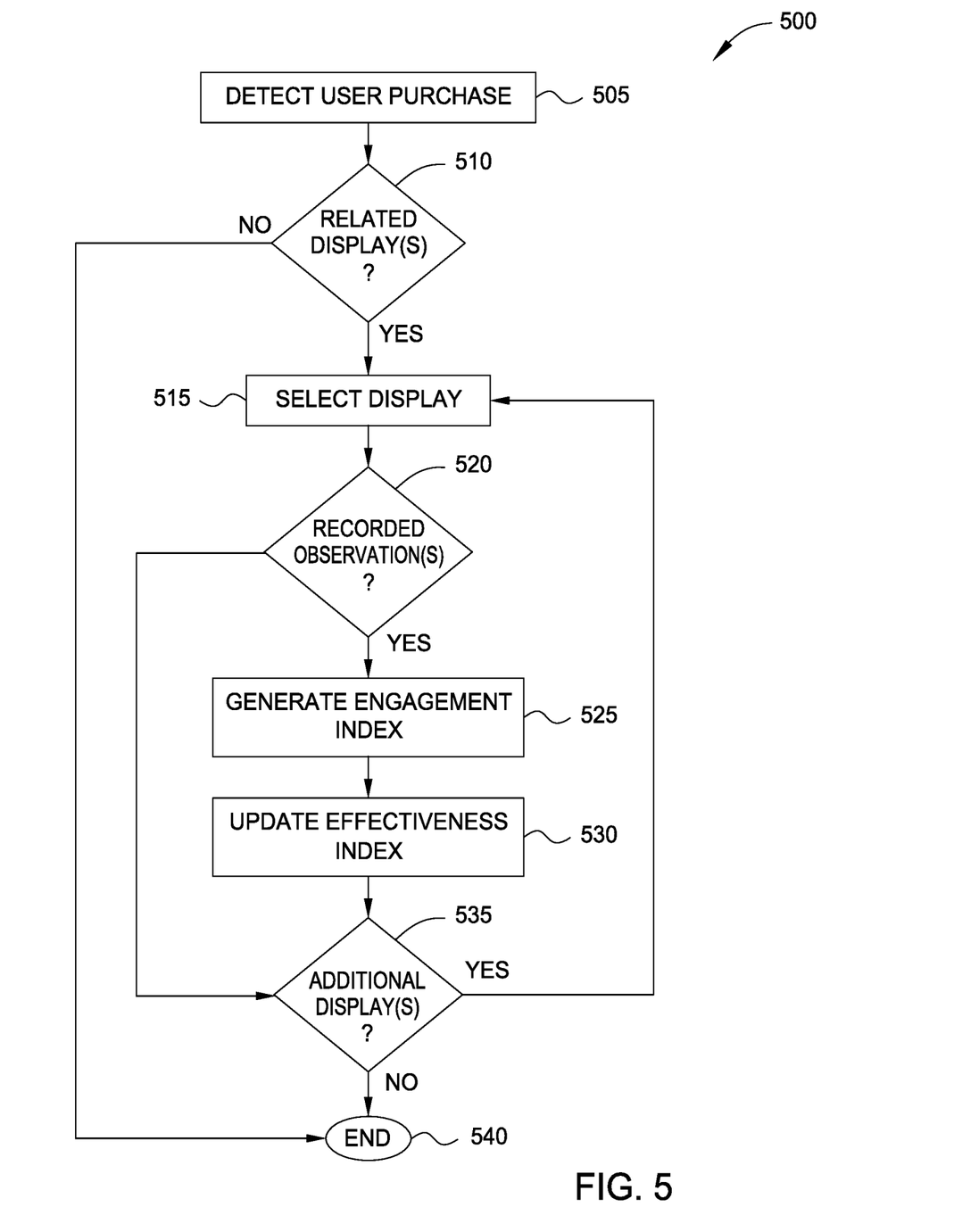
FIG. 5 is a flow diagram illustrating a method of cognitive analysis of user engagement, according to one embodiment disclosed herein.

FIG. 5 is a flow diagram illustrating a method 500 of cognitive analysis of user engagement, according to one embodiment disclosed herein. The method 500 begins at block 505, when the Analysis Application 130 determines that a user has purchased a product or service. In one embodiment, this determination comprises receiving information from the Transaction Database 160 that indicates that a user who has given permission to have their data processed by the Cognitive System 105 has made a purchase, and/or that a product or service associated with at least one Display 140 has been purchased. At block 510, the Determination Module 146 determines whether there is at least one Display 140 that is related to the purchased product or service (e.g., it advertises it or promotes it). In some embodiments (e.g., an embodiment where block 505 turns on determining that a product associated with a Display 140 was purchased, the Determination Module 146 may instead determine whether the individual who purchased the display is present in the User Database 155).

At block 515, the Determination Module 146 selects a Display 140 that features or promotes the purchased product or service. The method 500 then proceeds to block 520, where the Determination Module 140 determines whether the user who made the purchase has observed the selected Display 140. That is, in one embodiment, the Determination Module 146 determines whether any of the recorded Observations 135 include a reference to both the user who made the purchase, as well as to the selected Display 140. If not, the method 500 proceeds to block 535, where the Analysis Application 130 determines whether there are additional Displays 140 associated with the purchased product or service. If, however, the Determination Module 146 determines that the user observed the selected Display 140 at least once, the method 500 continues to block 525.

At block 525, the Determination Module 146 generates an engagement index for the user/Display 140 pair. As discussed above, this engagement index is a numeric value that generally indicates how much the selected Display 140 engaged the user, and how the Display 140 affected the user's purchasing decisions. In the illustrated embodiment, the method 500 then proceeds to block 530, where the Determination Module 146 updates the effectiveness index of the Display 140. For example, as discussed above, the effectiveness index for a particular Display 140 may be generated by aggregating the engagement indices of each user who viewed the display and subsequently purchased the associated product or service. In some embodiments, the effectiveness index is further based on the total number of users who observed the Display 140, regardless of whether or not they purchased the corresponding product or service. If, at block 535, it is determined that there are additional Displays 140 relating to the purchased product or service, the method 500 returns to block 515. Otherwise, the method 500 terminates at block 540.

Figure 6:
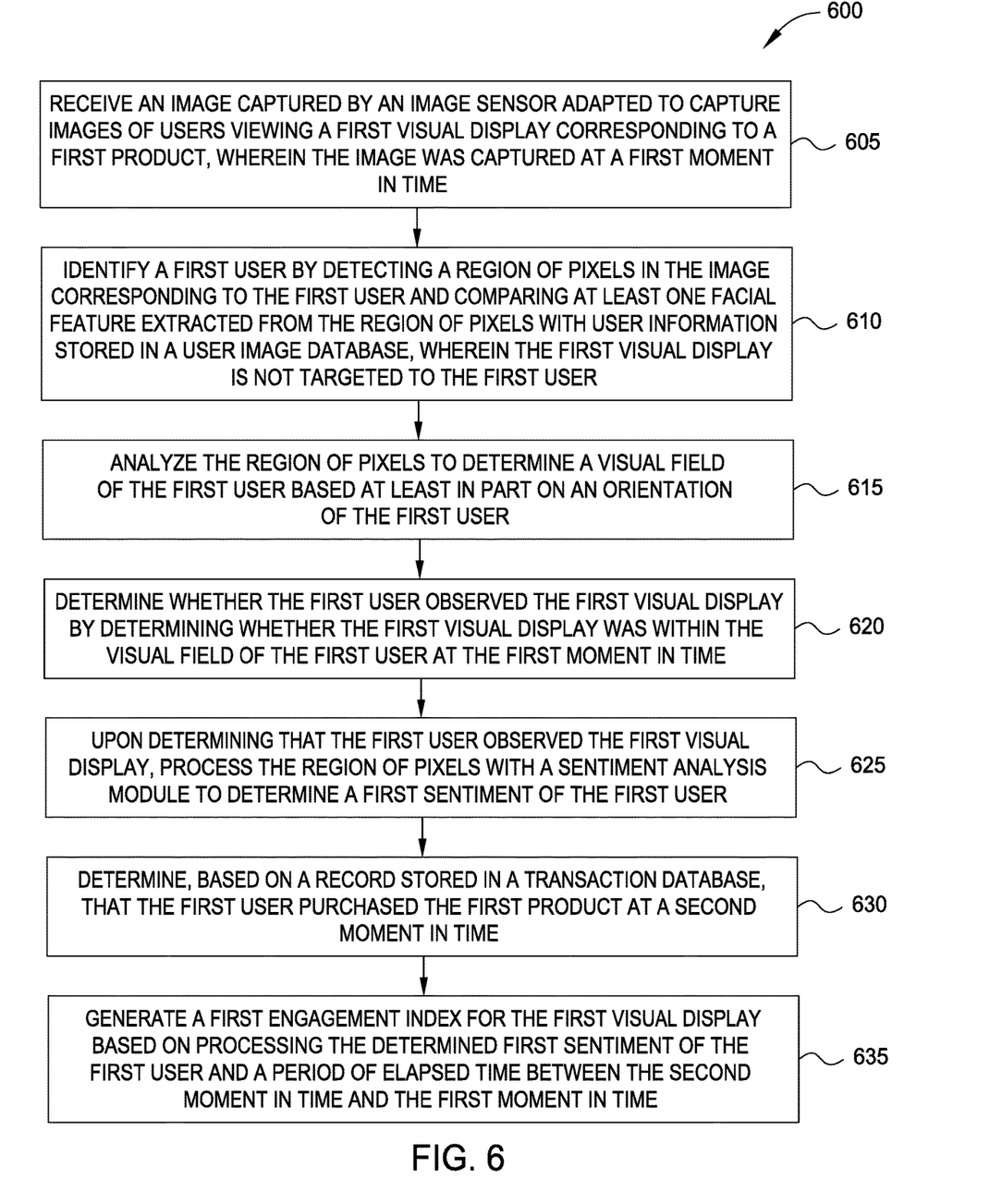
FIG. 6 is a flow diagram illustrating a method of cognitive analysis of user engagement, according to one embodiment disclosed herein.

FIG. 6 is a flow diagram illustrating a method 600 of cognitive analysis of user engagement, according to one embodiment disclosed herein. The method 600 begins at block 605, where the Analysis Application 130 receives an image captured by an imaging sensor adapted to capture images of users viewing a first visual display corresponding to a first product, wherein the image was captured at a first moment in time. At block 610, the Analysis Application 130 identifies a first user by detecting a region of pixels in the image corresponding to the first user and comparing at least one facial feature extracted from the region of pixels with user information stored in a user image database, wherein the first visual display is not targeted to the first user. The method 600 then continues to block 615, where the Analysis Application 130 analyzes the region of pixels to determine a visual field of the first user based at least in part on an orientation of the first user.

At block 620, the Analysis Application 130 determines whether the first user observed the first visual display by determining whether the first visual display was within the visual field of the first user at the first moment in time. The method 600 then continues to block 625 where, upon determining that the first user observed the first visual display, the Analysis Application 130 processes the region of pixels with a sentiment analysis module to determine a first sentiment of the first user. At block 630, the Analysis Application 130 determines, based on a record stored in a transaction database, that the first user purchased the first product at a second moment in time. Finally, at block 635, the Analysis Application 130 generates a first engagement index for the first visual display based on processing the determined first sentiment of the first user and a period of elapsed time between the second moment in time and the first moment in time.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the analysis application) or related data available in the cloud. For example, the cognitive system could execute on a computing system in the cloud and track user movements and reactions to physical non-targeted displays. In such a case, the analysis application could identify users and determine user sentiments in the cloud, and store observations and generated engagement and effectiveness indices at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
one or more computer processors; and
a memory containing a program which when executed by the one or more computer processors performs an operation, the operation comprising:
receiving an image captured by an imaging sensor adapted to capture images of users viewing a first visual display corresponding to a first product, wherein the image was captured at a first time;
identifying a first user by detecting a region of pixels in the image corresponding to the first user and comparing at least one facial feature extracted from the region of pixels with user information stored in a user image database, wherein the first visual display is not targeted to the first user;
analyzing the region of pixels to determine a visual field of the first user based at least in part on an orientation of the first user;
determining whether the first user observed the first visual display by determining whether the first visual display was within the visual field of the first user at the first time;

processing the region of pixels with a sentiment analysis module to determine a first sentiment of the first user, comprising determining that the first user did a double take;

receiving audio captured at the first time, wherein the first sentiment is further determined based on processing the audio using natural language processing (NLP) to determine whether the first user verbally expressed interest in the first product;

in response to determining, based on a record stored in a transaction database, that the first user purchased the first product at a second time:

identifying a plurality of visual displays related to the first product;

determining, for each respective visual display of the plurality of visual displays, whether the first user observed the respective visual display at least once prior to purchasing the first product; and in response to determining that the first user observed the first visual display at least once, generating a first engagement index for the first visual display, comprising:

determining a first elapsed time between an earliest time when the first user observed the first visual display and the second time;

determining a second elapsed time between an earliest time when the first user observed the first visual display while expressing interest in the first visual display, and the second time;

determining a first number of times that the user observed the first display, regardless of interest;

determining a second number of times that the user observed the first display and expressed interest in the first visual display; and generating the first engagement index based on (i) the determined first sentiment of the first user, (ii) the first elapsed time, (iii) the second elapsed time, (iv) the first number of times, and (v) the second number of times, wherein the first engagement index is inversely related to the first elapsed time and the second elapsed time.

2. The system of claim 1, wherein the first visual display is not associated with a point of sale where the first product can be purchased.

3. The system of claim 1, wherein the first visual display comprises an advertisement in a physical space, and wherein the first user purchased the first product using a website of an online retailer.

4. The system of claim 1, the operation further comprising:

generating a plurality of engagement indices for the first visual display based on data associated with a plurality of users, wherein each of the plurality of users also observed the first visual display and purchased the first product; and generating an effectiveness index for the first visual display based on the plurality of engagement indices.

5. The system of claim 1, wherein generating the effectiveness index is further based on a number of users who observed the first visual display and did not purchase the first product.

6. The system of claim 1, wherein generating the engagement index is further based on a number of times that the first user has ever observed the first visual display before purchasing the first product, and wherein determining the first sentiment comprises:

processing the region of pixels to determine a facial expression of the user; and processing the audio to determine whether the user talked about the first display.

7. A computer program product comprising a computer-readable storage medium having computer-readable program code embodied therewith, the computer-readable program code executable by one or more computer processors to perform an operation comprising:

receiving an image captured by an imaging sensor adapted to capture images of users viewing a first visual display corresponding to a first product, wherein the image was captured at a first time;

identifying a first user by detecting a region of pixels in the image corresponding to the first user and comparing at least one facial feature extracted from the region of pixels with user information stored in a user image database, wherein the first visual display is not targeted to the first user;

analyzing the region of pixels to determine a visual field of the first user based at least in part on an orientation of the first user;

determining whether the first user observed the first visual display by determining whether the first visual display was within the visual field of the first user at the first time;

processing the region of pixels with a sentiment analysis module to determine a first sentiment of the first user, comprising determining that the first user did a double take;

receiving audio captured at the first time, wherein the first sentiment is further determined based on processing the audio using natural language processing (NLP) to determine whether the first user verbally expressed interest in the first product;

in response to determining, based on a record stored in a transaction database, that the first user purchased the first product at a second time:

identifying a plurality of visual displays related to the first product;

determining, for each respective visual display of the plurality of visual displays, whether the first user observed the respective visual display at least once prior to purchasing the first product; and in response to determining that the first user observed the first visual display at least once, generating a first engagement index for the first visual display, comprising:

determining a first elapsed time between an earliest time when the first user observed the first visual display and the second time;

determining a second elapsed time between an earliest time when the first user observed the first visual display while expressing interest in the first visual display, and the second time;

determining a first number of times that the user observed the first display, regardless of interest;

determining a second number of times that the user observed the first display and expressed interest in the first visual display; and generating the first engagement index based on (i) the determined first sentiment of the first user, (ii) the first elapsed time, (iii) the second elapsed time, (iv) the first number of times, and (v) the second number of times, wherein the first engagement index is inversely related to the first elapsed time and the second elapsed time.

8. The computer program product of claim 7, wherein the first visual display is not associated with a point of sale where the first product can be purchased.

9. The computer program product of claim 7, wherein the first visual display comprises an advertisement in a physical space, and wherein the first user purchased the first product using a website of an online retailer.

10. The computer program product of claim 7, the operation further comprising:
   generating a plurality of engagement indices for the first visual display based on data associated with a plurality of users, wherein each of the plurality of users also observed the first visual display and purchased the first product; and
   generating an effectiveness index for the first visual display based on the plurality of engagement indices.

11. The computer program product of claim 7, wherein generating the effectiveness index is further based on a number of users who observed the first visual display and did not purchase the first product.

12. The computer program product of claim 7, wherein generating the engagement index is further based on a number of times that the first user has ever observed the first visual display before purchasing the first product, and wherein determining the first sentiment comprises:
   processing the region of pixels to determine a facial expression of the user; and
   processing the audio to determine whether the user talked about the first display.

* * * * *